F. J. ROBILLARD.
LOCOMOTIVE BRAKE ROD SAFETY BRACKET HANGER.
APPLICATION FILED MAY 23, 1919.
1,310,295.
Patented July 15, 1919.
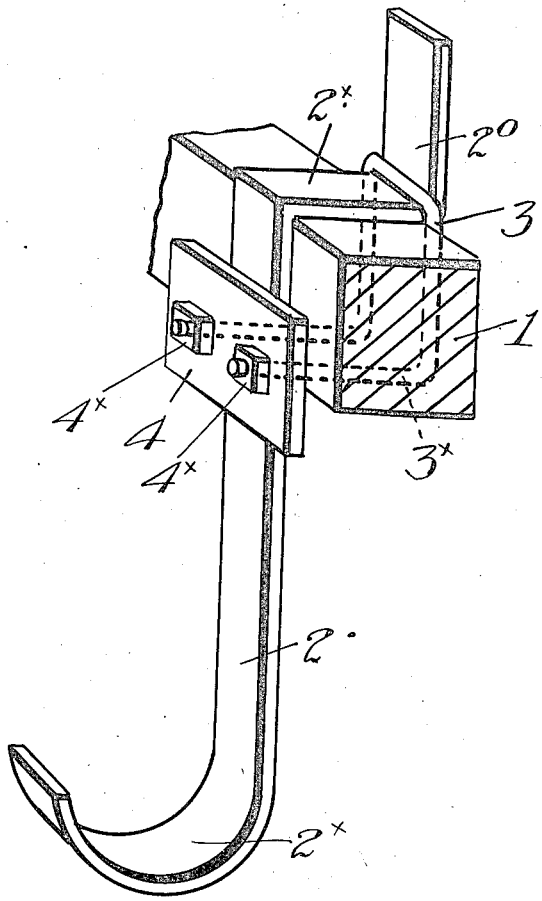
INVENTOR
FREDERICK J. ROBILLARD

UNITED STATES PATENT OFFICE.

FREDERICK JOSEPH ROBILLARD, OF ST. THOMAS, ONTARIO, CANADA.

LOCOMOTIVE-BRAKE-ROD SAFETY BRACKET-HANGER.

1,310,295.  Specification of Letters Patent.  Patented July 15, 1919.

Application filed May 23, 1919. Serial No. 299,307.

*To all whom it may concern:*

Be it known that I, FREDERICK JOSEPH ROBILLARD, of the city of St. Thomas, in the county of Elgin, in the Province of Ontario, Canada, have invented certain new and useful Improvements in Locomotive-Brake-Rod Safety Bracket-Hangers, of which the following is a specification.

My invention relates to improvements in locomotive brake rod safety bracket hangers and the object of the invention is to devise a strong and durable means for securing the bracket hanger to the frame of the locomotive and which will obviate weakening of the locomotive frame or hanger in order to secure the hanger bracket to the frame and it consists of the arrangement and construction of parts as hereinafter more particularly explained.

The figure represents a perspective view of my hanger bracket connected by my securing means to a portion of an engine frame.

It will be understood that the hanger bracket which is in the form of a hook depending from the engine frame is ordinarily secured to the frame by means of bolts extending through the frame and bracket. This weakens both the frame and bracket causing the bracket very often to break away. It will, of course, be understood that the safety bracket is for the purpose of catching and supporting the brake rod should such rod become broken. In order to obviate this defect I have provided the following construction.

1 indicates a portion of an engine frame. 2 indicates a hanger bracket provided with the usual hook-shaped lower end $2^x$ over which the brake rod leading to the brakes extends. The upper end of the hanger bracket 2 is provided with an offset $2^x$ extending over the engine frame 1 and slightly protrudes over the opposite side of the frame, such protruding portion being provided with an upward extension $2°$. 3 indicates a U-bolt, the arms of which are bent into L-shape form at $3^x$. 4 indicates a plate provided with orifices through which the arms of the U-bolt 3 extend, being secured in position by nuts $4^x$. The hanger bracket 2 is set upon the engine frame 1 with a portion $2^x$ of the bracket extending over the top of the bar of the engine frame and extending so as to protrude slightly beyond the opposite side of the bar. The U-bolt is then placed over the portion $2^x$ within the portion $2°$ so as to bear in the angle formed by the portions $2^x$ and $2°$, the arms of the U-bolt extending vertically against the corresponding face of the engine frame bar, the bent ends $3^x$ of the arms extending beneath the engine frame bar and at each side of the bracket 2. The plate 4 is then inserted in position, the ends of the arms $3^x$ passing through such plate, being secured by the nuts $4^x$.

By this means it will be seen that the whole weight of the bracket rests upon the top of the engine frame so that it has a solid bearing thereon, the U-bolt 3 clamping it in position around the engine frame.

From this description it will be seen that I have devised a very simple device whereby a safety hanger bracket for locomotive brake rods may be secured in position without weakening the engine frame or bracket and in such a way that it may be easily and quickly removed whenever desired.

What I claim as my invention is.

1. In a safety hanger bracket for locomotive brake rods, a hanger bracket provided at its upper end with an offset portion adapted to rest upon the top of a bar portion of a locomotive frame and terminating in an upwardly offset portion, of means engaging the upwardly offset portion and the body of the hanger bracket for clamping it to the engine frame.

2. In a safety hanger bracket for locomotive brake rods, a hanger bracket provided at its upper end with an offset portion adapted to rest upon the top of a bar portion of a locomotive frame and terminating in an upwardly offset portion, of a U-bolt engaging the upwardly offset portion at its base and having its arms depending vertically and provided with horizontally turned ends adapted to extend beneath the engine frame and at each side of the bracket, and a plate and securing nuts for connecting the arms at the outside of the bracket.

3. In a safety hanger bracket for locomotive brake rods, a hanger bracket provided at its upper end with an offset portion adapted to rest upon the top of a bar portion of a locomotive frame, and means engaging such offset portion at one end and embracing the bar portion of the locomotive frame and the depending portion of the hanger bracket for clamping the parts together.

FREDERICK JOSEPH ROBILLARD.

Witnesses:
P. JEFFERSON,
R. H. McCONNELL.